(12) United States Patent
Jeng et al.

(10) Patent No.: US 10,166,717 B2
(45) Date of Patent: Jan. 1, 2019

(54) PHOTO-SODIFICATION MODELING APPARATUS AND METHOD

(71) Applicant: National Taiwan University of Science and Technology, Taipei (TW)

(72) Inventors: Jeng-Ywan Jeng, Taipei (TW); Yih-Lin Cheng, Taipei (TW); Freeman Chen, Taipei (TW); Han-Hsuan Lee, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 458 days.

(21) Appl. No.: 14/883,037

(22) Filed: Oct. 14, 2015

(65) Prior Publication Data

US 2016/0361871 A1 Dec. 15, 2016

(30) Foreign Application Priority Data

Jun. 15, 2015 (TW) .............................. 104119216 A (51) Int. Cl.
| | | |
|---|---|---|
| *B29C 67/00* | (2017.01) | |
| *B29C 64/124* | (2017.01) | |
| *B29C 64/245* | (2017.01) | |
| *B33Y 10/00* | (2015.01) | |
| *B33Y 30/00* | (2015.01) | |
| *B29C 64/20* | (2017.01) | |

(52) U.S. Cl.
CPC ............ *B29C 64/124* (2017.08); *B29C 64/20* (2017.08); *B29C 64/245* (2017.08); *B33Y 10/00* (2014.12); *B33Y 30/00* (2014.12)

(58) Field of Classification Search
CPC ..... B29C 64/124; B29C 64/245; B29C 64/20; B33Y 30/00; B33Y 10/00
See application file for complete search history.

(56) References Cited

U.S. PATENT DOCUMENTS

2009/0126565 A1* 5/2009 Cooper ............... G03F 7/70341
95/28

\* cited by examiner

*Primary Examiner* — Robert J Grun
(74) *Attorney, Agent, or Firm* — WPAT, PC (57) ABSTRACT

A photo-sodification modeling apparatus is provided. The apparatus comprises: a container, a holding plate, a lifting mechanism, a light source module, and a control unit. The container provides an accommodation space for accommodating a light-curable material, and includes: a base plate and a wall structure. The base plate is transparent or translucent. The wall structure is disposed around the base plate. The lifting mechanism is used for moving the holding plate. The light source module is disposed under the container. During formation of a solidified layer of a three-dimensional object, the base plate provides an electric or magnetic field so that the light-curable material in the container will not solidify on a surface of the base plate, thus resulting in the solidified layer having a reduced viscosity when the solidified layer is closer to the surface of the base plate.

16 Claims, 6 Drawing Sheets

PHOTO-SODIFICATION MODELING APPARATUS AND METHOD

CROSS-REFERENCES TO RELATED APPLICATION

This non-provisional application claims priority under 35 U.S.C. § 119(a) on Patent Application No. 104119216 filed in Taiwan, R.O.C. on Jun. 15, 2015, the entire contents of which are hereby incorporated by reference.

BACKGROUND

Technical Field

The invention relates to solid freeform fabrication technology, and particularly to photo-sodification modeling technology for forming a three-dimensional object from a light-curable material.

Related Art

Photo-sodification modeling technology produces a three-dimensional object by stacking and bonding thin layers of solid-state formed from a light-curable liquid resin. There are two conventional approaches for the implementation of the conventional photo-sodification modeling devices, i.e., the stereolithography machines.

The first approach is to make the light patterns projected from the top to the tank to cure the liquid light curing material in the tank. For this top-down configuration, the size of the tank must be able to maintain adequate resin in which an object to be printed is completely immersed. The surface of the resin needs to be leveled before the exposure of each layer, thereby ensuring uniformity of each layer. In addition, the surface of the resin in the process of printing does not stay at the same level, and the vertical displacement then needs to be compensated in order to maintain the same thickness of each layer to be printed. Further, the photo-solidification occurs on the surface of the light-curable resin in contact with air. For this reason, the problem of oxygen inhibition increased the curing time of the resin.

The second approach is to make light patterns projected from a place under the tank to the transparent bottom of the tank so as to cure the liquid light-curable material. This approach can improve the drawback of the above stereolithography machine, for example, to simplify the structure of the machine and result in a significant reduction in the volume of the tank. In addition, a cured layer is formed between the bottom of the tank and a previous cured layer or a formation platform. Since the cured layer is not formed over the surface of the liquid light-curable material in contact of the air, the problems of uniformity of layers and oxygen inhibition will cease to exist, and it no longer needs a resin surface leveling device in the machine. Each layer is separated from the bottom of the tank, and is elevated to reserve space for the next layer to be printed.

However, since the result of the Van der Waals force, chemical bonding force and attractive force, an adhesion phenomenon occurs between the cured layer and the tank, resulting in difficulties in pulling the cured layer by the formation platform. The magnitude of the separation force is directly correlated with the strength of the above forces and the area of the cured layer, and is one of the most important limiting factors to the printing of high resolution. In order to reduce adhesion, some technology for improvement of sticking phenomenon employs an elastic membrane, such as Teflon or silicone at the bottom of the tank, thereby to prevent the cured layer from sticking to the tank. However, the separation force is still too large to print finely, even with these improvements.

SUMMARY

Accordingly, the invention is directed to a photo-sodification modeling apparatus and a photo-sodification modeling method. The photo-sodification modeling technology according to the invention employs a technique capable of making charged components, obtained during the photo sodification of a light-curable material (such as cationic group, charged monomer or oligomer), be moved outside the surface of a base plate, thus achieving that the solidified layer has a reduced viscosity when the solidified layer is closer to the surface of the base plate.

The invention provides an embodiment of a photo-sodification modeling apparatus, comprising: a container, a holding plate, a lifting mechanism, a light source module, and a control unit. The container has an accommodation space for accommodating a light-curable material. The container includes: a base plate, which is transparent or translucent; and a wall structure, disposed around the base plate, the base plate and the wall structure form the accommodation space. The lifting mechanism is employed for moving the holding plate. The light source module is disposed under the container. The control unit is employed for controlling the light source module and the lifting mechanism. The photo-sodification modeling apparatus forms a three-dimensional object layer by layer from a plurality of solidified layers, wherein after the light source module irradiates the light-curable material to form one of the solidified layers on the holding plate due to photo-solidification, the lifting mechanism moves the holding plate. The base plate provides an electric or magnetic field during formation of the solidified layer of the three-dimensional object, so that the light-curable material in the container will not solidify on a surface of the base plate, thus resulting in the solidified layer having a reduced viscosity when the solidified layer is closer to the surface of the base plate.

The invention further provides an embodiment of a photo-sodification modeling method comprising the following. A photo-sodification modeling apparatus including a container, a holding plate, a lifting mechanism, and a light source module is provided. An electric field or magnetic field is provided on a base plate of the container. A three-dimensional object is formed layer by layer from a plurality of solidified layers by repeating steps including: forming one of the solidified layers on the holding plate by irradiating a light-curable material in the container by using the light source module, and then moving the holding plate by the lifting mechanism During the formation of the solidified layer, the electric or magnetic field is provided on the base plate so that the light-curable material in the container will not solidify on a surface of the base plate, thus resulting in the solidified layer having a reduced viscosity when the solidified layer is closer to the surface of the base plate.

For better understanding of the above and other aspects of the invention, a plurality of embodiments or examples will be taken with accompanying drawings to provide detailed description as follows.

DETAILED DESCRIPTION

The modeling technology according to the invention employs a technique capable of making charged components (such as cationic group, charged monomer or oligomer) obtained during the photo sodification of a light-curable material be moved outside the surface of a base plate, thus achieving that a solidified layer has a reduced viscosity when the solidified layer is closer to the surface of the base plate.

In the following, various embodiments of the invention will be illustrated by way of examples of the structure of the photo-sodification modeling apparatus, according to the above viewpoint of the invention.

Figure 1:
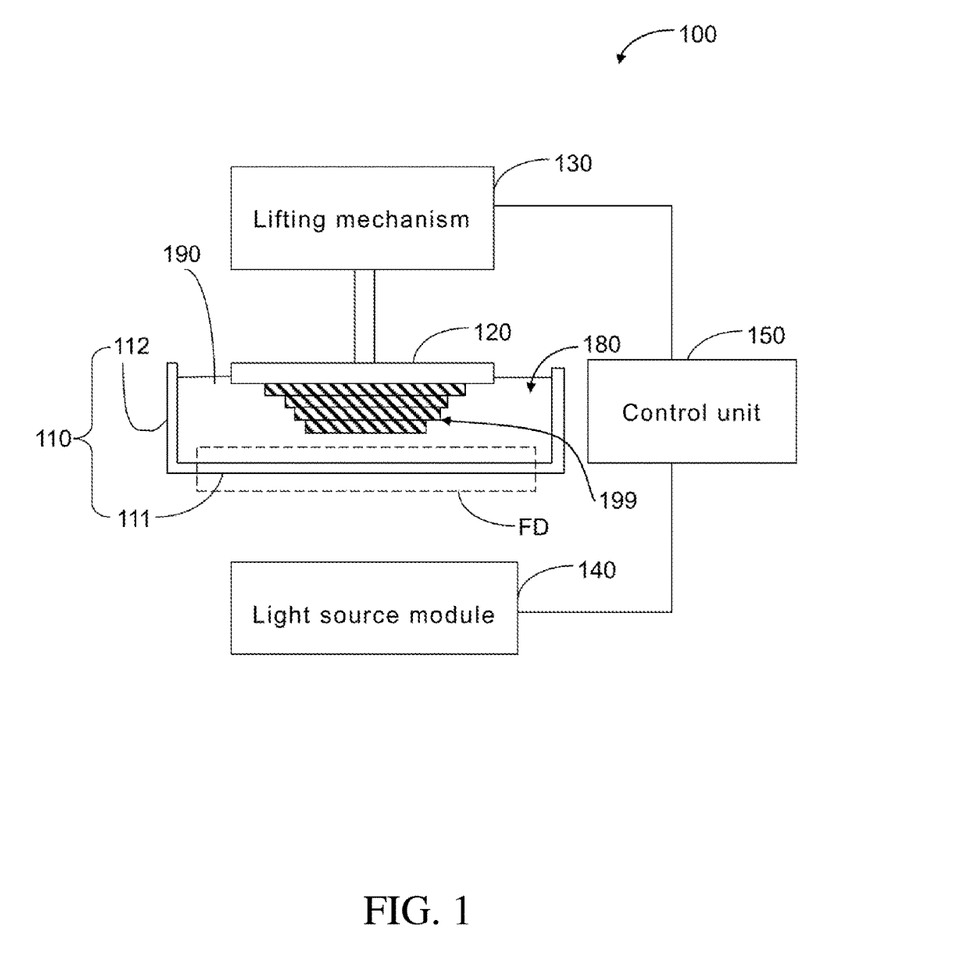
FIG. 1 is a block diagram illustrating a photo-sodification modeling apparatus according to an embodiment of the invention.

FIG. 1 illustrates a photo-sodification modeling apparatus according to an embodiment of the invention. As shown in FIG. 1, a photo-sodification modeling apparatus 100 comprises a container 110, a holding plate 120, a lifting mechanism 130, a light source module 140, and a control unit 150. The container 110 has accommodation space 180 which is capable of accommodating the light-curable material 190. The lifting mechanism 130 is employed for moving the holding plate 120, e.g., upwards or downwards. The light source module 140 is disposed under the container 110. The control unit 150 is employed for controlling the light source module 140 and the lifting mechanism 130. In addition, the container 110 comprises: a base plate 111 and a wall structure 112. The base plate 111 is transparent or translucent; the wall structure 112 is disposed around the base plate 111, and the base plate 111 and the wall structure 112 form the accommodation space 180.

The photo-sodification modeling apparatus 100 forms a three-dimensional object 199, layer by layer, from a plurality of solidified layers by repeating the following including: after the light source module 140 irradiates the light-curable material 190 to form one of the solidified layers on the holding plate 120 due to photo-solidification, the holding plate 120 is moved by the lifting mechanism 130.

In the photo-sodification modeling apparatus 100 as shown in FIG. 1, during the formation of a solidified layer, the base plate 111 utilizes or forms, or provides, an electric or magnetic field, indicated by a physical field FD (e.g., the physical field FD as indicated by dashed lines) so that the light-curable material 190 in the container 110 will not solidify on a surface of the base plate 111, thus resulting in the solidified layer having a reduced viscosity when the solidified layer is closer to the surface of the base plate. Therefore, the photo-sodification modeling apparatus according to the invention can avoid the difficulties in separating a three-dimensional object formed by the stereolithography technology from a base plate due to a solidified layer of the object solidifying and sticking on the surface of the base plate.

Figure 2A:
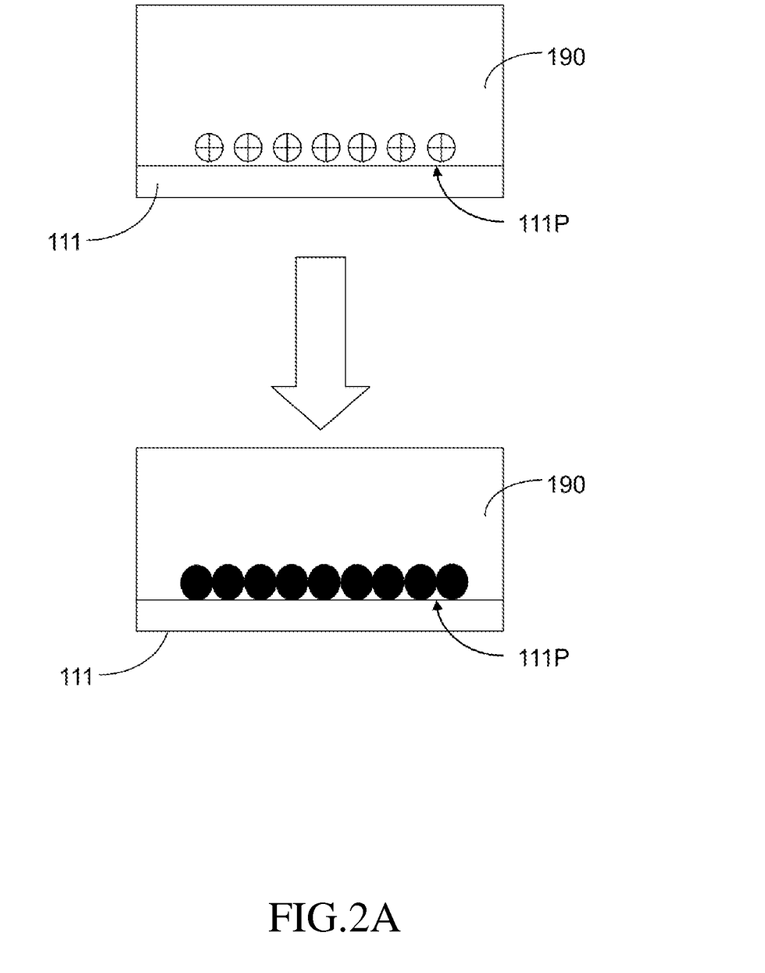
FIGS. 2A and 2B are schematic diagrams illustrating that photo-solidification will not occur on a base plate, according to embodiments of the invention.

In the conventional stereolithography technology, photo-solidification occurs due to crosslinking polymerization of monomers and corresponding oligomers of a light-curable material, e.g., a photo-sensitive resin such as photopolymer, with free radicals or cationic groups produced after a photoinitiator of the photo-sensitive resin absorbs ultraviolet lights (for example, ultraviolet light at a wavelength of 250-300 nm). For the sake of illustration of the conventional problem, the photo-sodification modeling apparatus 100 is taken, as illustrated in FIG. 2A, and it is supposed that the base plate 111 would not use any electric field or magnetic field during the formation of a solidified layer. In this case, cationic groups would gather on a surface 111P of the base plate 111, and thus a layer would be solidified and stuck on the surface 111P of the base plate 111, resulting in the conventional problem of adhesion.

Figure 2B:
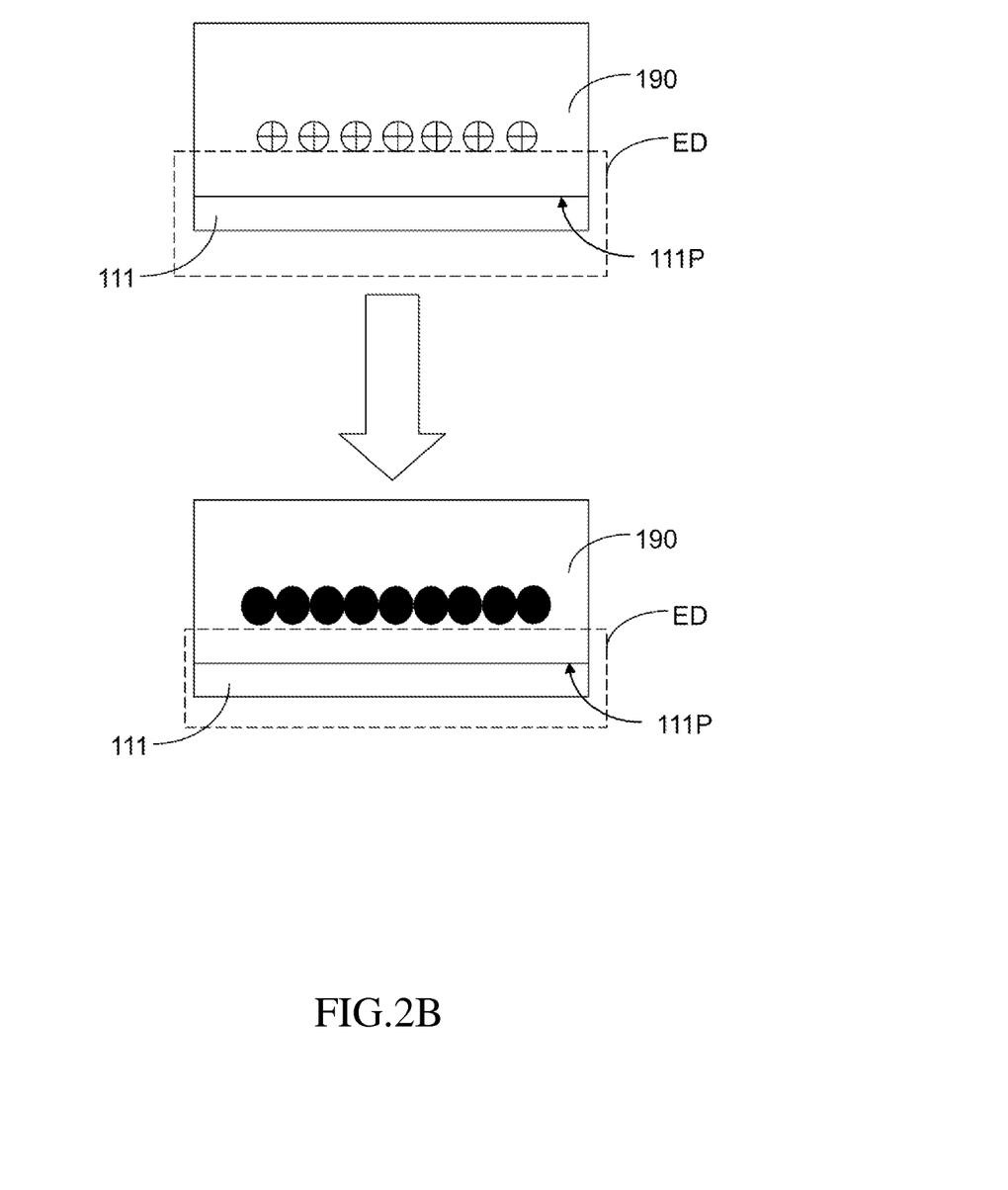

As illustrated in FIG. 2B, in the photo-sodification modeling apparatus 100, during the formation of a solidified layer, photo-solidification occurs above the surface 111P of the base plate 111 which utilizes an electric field ED, wherein charged components such as cations are moved upwards by a repelling force produced by the electric field ED, e.g., in a direction along a positive direction of the electric field, to a position where the photo-solidification continues. Similarly, photo-solidification occurs above a surface 111P of the base plate 111 which utilizes a magnetic field, wherein charged components such as cations are moved upwards by a force produced by the magnetic field, e.g., the directions of the magnetic lines of force being around the surface 111P of the base plate 111, to a position where the photo-solidification continues. In this way, no photo-solidification will occur on the surface of the base plate in the embodiments of the invention.

Some embodiments utilizing an electric field or magnetic field on the base plate 111, as above mentioned, will be provided as follows.

Figure 3:
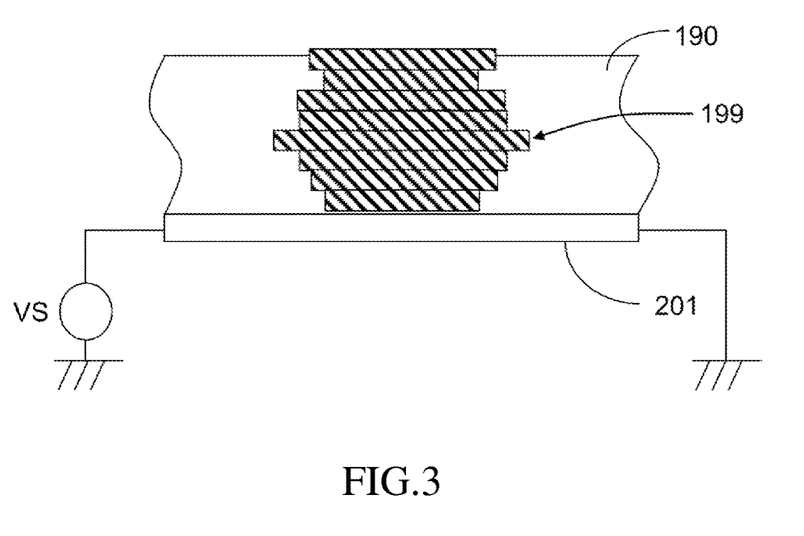
FIG. 3 illustrates a cross-section of a container in an embodiment of the invention.

FIG. 3 illustrates a cross-section of a container in an embodiment of the invention. In FIG. 3, a base plate 111 comprises a first conductive layer 201. During the formation of a solidified layer, a magnetic field is formed by applying a voltage (e.g., using a power source VS) between two sides of the first conductive layer 201 of the base plate 111 so that the light-curable material 180 in the container 110 will not solidify on the surface of the base plate 111, whereby the solidified layer has a reduced viscosity when the solidified layer is closer to the surface of the base plate.

Figure 4:
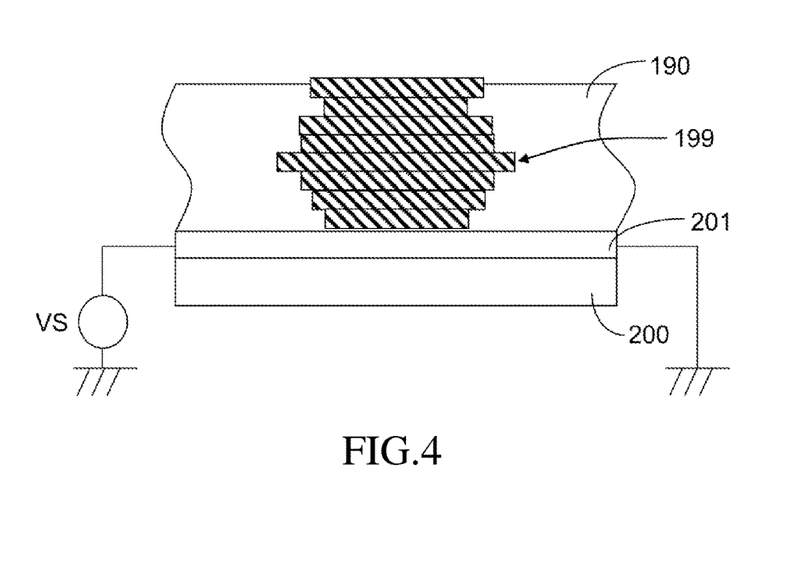
FIG. 4 illustrates a cross-section of a container in another embodiment of the invention.

FIG. 4 illustrates a cross-section of a container in another embodiment of the invention. In FIG. 4, a base plate 111 comprises a substrate 200 and a first conductive layer 201. During the formation of a solidified layer, a magnetic field is formed by making an electric current flowing through the first conductive layer 201 by applying a voltage (e.g., using a power source VS) between two sides of the first conductive layer 201 of the base plate 111 so that the light-curable material 180 in the container 110 will not solidify on the surface of the base plate 111, whereby the solidified layer has a reduced viscosity when the solidified layer is closer to the surface of the base plate.

In addition, the light-curable material 180 can be prevented from being solidified on the surface of the base plate 111 by forming a magnetic field with a suitable magnitude through adjusting the magnitude of the electric current flowing through the first conductive layer 201, since the magnitude of the magnetic field is proportional to the current magnitude, according to the magnetic effect of electric currents.

Figure 5:
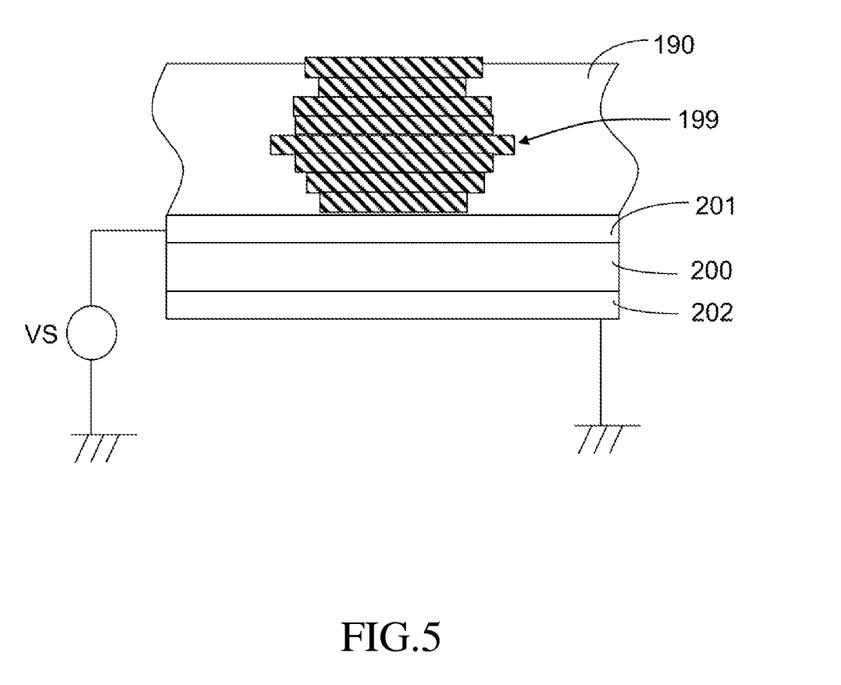
FIG. 5 illustrates a cross-section of a container in another embodiment of the invention.

FIG. 5 illustrates a cross-section of a container in another embodiment of the invention. In FIG. 5, a base plate 111 comprises a substrate 200, a first conductive layer 201, and a second conductive layer 202. The first conductive layer 201 is disposed between the light-curable material 180 accommodated by the container 110 and the substrate 200; the substrate 200 is disposed between the first conductive layer 201 and the second conductive layer 202. During the formation of a solidified layer, an electric field is formed by charging (e.g., applying a positive voltage from a power source VS) between the first conductive layer 201 and the second conductive layer 202 so that the light-curable material 180 in the container 110 will not solidify on the surface of the base plate 111, whereby the solidified layer has a reduced viscosity when the solidified layer is closer to the surface of the base plate.

In addition, the magnitude of the electric field, denoted by $E_{ab}$, between the first conductive layer 201 and the second conductive layer 202 can be expressed by a simplified formula of $E_{ab}=V_{ab}/d$, wherein $V_{ab}$ denotes a voltage applied between the first conductive layer 201 and the second conductive layer 202, and d denotes a distance between them. By this formula, the light-curable material 180 can be prevented from being solidified on the surface of the base plate 111 by forming an electric field with a suitable magnitude through adjusting the magnitude of the voltage $V_{ab}$ or the distance d.

In addition, in FIGS. 3 to 5, the first conductive layer 201 can be a transparent conductive film; the substrate 200 can be implemented by using glass, ceramic, or any suitable transparent or translucent material. Further, the substrate 200 and the first conductive layer 201 (and/or the second conductive layer 202) can be implemented by using glass of transparent conductive oxide (TCO), for example: any one of Indium Tin Oxide (ITO) conductive glass, Florine Doped Tin Oxide (FTO) conductive glass, Al-doped ZnO (AZO) conductive glass; Ga.Zno (GZO) conductive glass, Indium Zinc Oxide (IZO) conductive glass, Zinc Oxide (ZnO) conductive glass. In addition, the conductive layer(s) of any one of the embodiments (the first conductive layer 201 and/or second conductive layer 202) can be implemented by a material(s) such as conductive polymer materials, carbon nanotube materials, nano particle materials, or metal nanowires. One or more conductive layers in any of the above embodiments can be implemented by using any conductive material having good light transmittance (e.g., transparent or translucent) if the material is capable of producing an electric field or magnetic field after being powered.

In any of the embodiments of the photo-sodification modeling apparatus, the light source module can be implemented by using an ultraviolet light source. However, the invention is not limited to the type of the light source module; any light source module which can be employed for generating mask images (or patterns) of a plurality of cross-section layers of a three-dimensional object to be formed can be utilized in the implementation of the light source module.

In order to further avoid the above problem of adhesion due to photo-solidification, in any of the embodiments of a photo-sodification modeling apparatus, the light source module can be implemented by using: one of a visible light source, visible laser source, and infrared laser source, wherein a suitable light-curable material can be solidified by the light source. As compared to using an ultraviolet light source, as in a conventional way, for the generation of mask images for the photo-sodification modeling apparatus, the pulling force for the separation of the solidified layer from the base plate is relatively reduced in the embodiments using the light sources of long wavelength lights, not ultraviolet lights, such as a visible light source (e.g., a wavelength in a range of 400 nm to 760 nm) or an infrared light source (e.g., a wavelength in a range of 760 nm to 10000 nm). The pulling force for the separation is reduced since the light from a long wavelength light source has a relatively higher penetrability with respect to a liquid than that of ultraviolet lights, when the light from the long wavelength light source irradiates and penetrates the base plate 111, the hardness of the light-curable material on the surface of the base plate 111 is less than that of the light-curable material outside the surface of the base plate 111.

Figure 6:
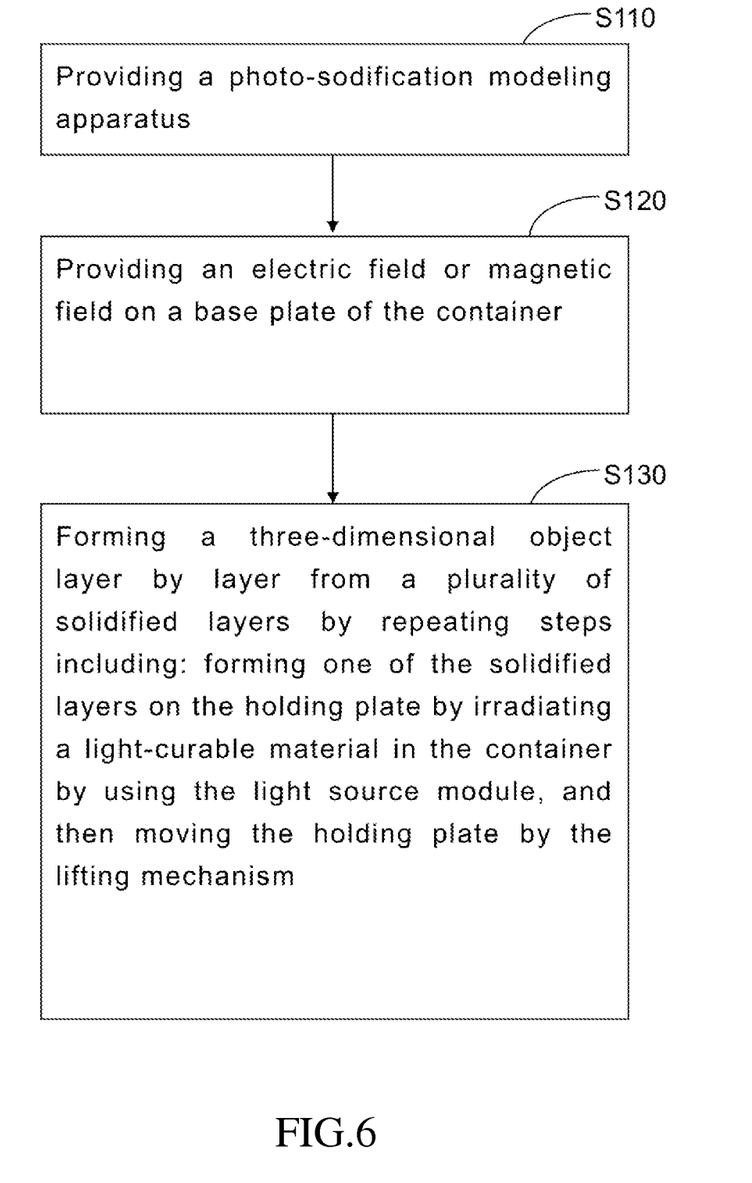
FIG. 6 is a flowchart illustrating a photo-sodification modeling method according to an embodiment of the invention.

FIG. 6 shows a flowchart of a photo-sodification modeling method according to an embodiment of the invention. In FIG. 6, as shown in step S110, a photo-sodification modeling apparatus, including a container, a holding plate, a lifting mechanism, and a light source module, is provided. As shown in step S120, an electric field or magnetic field is provided on a base plate of the container. As shown in step S130, a three-dimensional object is formed layer by layer from a plurality of solidified layers by repeating steps including: forming one of the solidified layers on the holding plate by irradiating a light-curable material in the container by using the light source module, and then moving the holding plate by the lifting mechanism. During the formation of the solidified layer, an electric or magnetic field is utilized or provided on the base plate so that the light-curable material in the container will not solidify on a surface of the base plate, thus resulting in the solidified layer having a reduced viscosity when the solidified layer is closer to the surface of the base plate.

In the above photo-sodification modeling method, a magnetic field can be formed on the base plate by applying electricity to a first conductive layer of the base plate during the formation of a solidified layer, so that the light-curable material in the container will not solidify on the surface of the base plate, thus resulting in the solidified layer having a reduced viscosity when the solidified layer is closer to the surface of the base plate.

In the above photo-sodification modeling method, an electric field can be formed on the base plate by applying electricity to or charging two corresponding conductive layers of the base plate during the formation of a solidified layer, so that the light-curable material in the container will not solidify on the surface of the base plate, thus resulting in the solidified layer having a reduced viscosity when the solidified layer is closer to the surface of the base plate.

In the above photo-sodification modeling method, the light source module can irradiate the light-curable material by using one of a visible light, visible laser, and infrared laser so that photo-solidification occurs on the light-curable material.

In the above photo-sodification modeling method, any one of the embodiments of the photo-sodification modeling apparatus can be utilized for the implementation of the method.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A photo-sodification modeling apparatus comprising:
a container, for accommodating a light-curable material, the container including:
a base plate for providing a magnetic field, which is transparent or translucent and comprising a first conductive layer; and
a wall structure, disposed around the base plate;
a holding plate;
a lifting mechanism for moving the holding plate;
a light source module disposed under the container, for irradiating the light-curable material to form a solidified layer on the holding plate; and
a control unit for controlling the light source module and the lifting mechanism; wherein
the first conductive layer in the base plate is configured to form the magnetic field using electricity during formation of the solidified layer, so that the light-curable material in the container will not solidify on a surface of the base plate, thus resulting in the solidified layer having a reduced viscosity when the solidified layer is closer to the surface of the base plate.

2. The photo-sodification modeling apparatus according to claim 1, wherein the photo-sodification modeling apparatus is configured to form a three-dimensional object layer by layer from a plurality of solidified layers, wherein after the light source module irradiates the light-curable material to form one of the solidified layers on the holding plate due to photo-solidification, the lifting mechanism moves the holding plate.

3. The photo-sodification modeling apparatus according to claim 1, wherein the light source module comprises: one light source selected from a visible light source, visible laser source, and infrared laser source, wherein the light source irradiates the light-curable material so that photo-solidification occurs.

4. The photo-sodification modeling apparatus according to claim 1, wherein the light source module comprises: one light source selected from a visible light source, visible laser source, and infrared laser source, wherein the light source irradiates the light-curable material so that photo-solidification occurs.

5. The photo-sodification modeling apparatus according to claim 1, wherein the base plate further comprises a substrate, the first conductive layer is disposed between the light-curable material in the container and the substrate.

6. The photo-sodification modeling apparatus according to claim 5, wherein the substrate is glass or ceramic.

7. The photo-sodification modeling apparatus according to claim 5, wherein the light source module comprises: one light source selected from a visible light source, visible laser source, and infrared laser source, wherein the light source irradiates the light-curable material so that photo-solidification occurs.

8. A photo-sodification modeling apparatus comprises:
a container, for accommodating a light-curable material, the container including:
a base plate for providing an electric field, which is transparent or translucent and comprising: a substrate; a first conductive layer, disposed between the light-curable material in the container and the substrate; and a second conductive layer, wherein the substrate is disposed between the first conductive layer and the second conductive layer; and
a wall structure, disposed around the base plate;
a holding plate;
a lifting mechanism for moving the holding plate;
a light source module disposed under the container, for irradiating the light-curable material to form a solidified layer on the holding plate; and
a control unit for controlling the light source module and the lifting mechanism;
wherein the first conductive layer and the second conductive layer are configured for forming an electric field by applying electricity therebetween during the formation of the solidified layer so that the light-curable material in the container will not solidify on the surface of the base plate, thus resulting in the solidified layer having a reduced viscosity when the solidified layer is closer to the surface of the base plate.

9. The photo-sodification modeling apparatus according to claim 8, wherein the substrate is glass or ceramic.

10. The photo-sodification modeling apparatus according to claim 8, wherein the light source module comprises: one light source selected from a visible light source, visible laser source, and infrared laser source, wherein the light source irradiates the light-curable material so that photo-solidification occurs.

11. A photo-sodification modeling method comprising:
providing a photo-sodification modeling apparatus including a container, a holding plate, a lifting mechanism, and a light source module;
providing an electric field or magnetic field on a base plate of the container; and
forming a three-dimensional object layer by layer from a plurality of solidified layers by repeating steps including: forming one of the solidified layers on the holding plate by irradiating a light-curable material in the container by using the light source module, and then moving the holding plate by the lifting mechanism;
wherein during the formation of the solidified layer, the electric or magnetic field is provided on the base plate so that the light-curable material in the container will not solidify on a surface of the base plate, thus resulting in the solidified layer having a reduced viscosity when the solidified layer is closer to the surface of the base plate.

12. The photo-sodification modeling method according to claim 11, wherein the light source module irradiates the light-curable material by using one of a visible light, visible laser, and infrared laser so that photo-solidification occurs on the light-curable material.

13. The photo-sodification modeling method according to claim 11, wherein a magnetic field is formed on the base plate by applying electricity to a first conductive layer of the base plate during the formation of the solidified layer, so that the light-curable material in the container will not solidify on the surface of the base plate, thus resulting in the solidified layer having a reduced viscosity when the solidified layer is closer to the surface of the base plate.

14. The photo-sodification modeling method according to claim 13, wherein the light source module irradiates the light-curable material by using one of a visible light, visible laser, and infrared laser so that photo-solidification occurs on the light-curable material.

15. The photo-sodification modeling method according to claim 11, wherein an electric field is formed on the base plate by applying electricity to two conductive layers of the base plate during the formation of the solidified layer, so that the light-curable material in the container will not solidify on the surface of the base plate, thus resulting in the solidified layer having a reduced viscosity when the solidified layer is closer to the surface of the base plate.

16. The photo-sodification modeling method according to claim 15, wherein the light source module irradiates the light-curable material by using one of a visible light, visible laser, and infrared laser so that photo-solidification occurs on the light-curable material.

\* \* \* \* \*